(12) United States Patent
Beznes

(10) Patent No.: US 10,227,049 B2
(45) Date of Patent: Mar. 12, 2019

(54) AUTOMOBILE FISHING ROD TRANSPORTATION RACK ATTACHMENT

(71) Applicant: Vadim Beznes, Valrico, FL (US)

(72) Inventor: Vadim Beznes, Valrico, FL (US)

( * ) Notice: Subject to any disclaimer, the term of this patent is extended or adjusted under 35 U.S.C. 154(b) by 0 days.

(21) Appl. No.: 15/462,422

(22) Filed: Mar. 17, 2017

(65) Prior Publication Data

US 2018/0265013 A1 Sep. 20, 2018

(51) Int. Cl.
*B60R 9/00* (2006.01)
*B60R 9/08* (2006.01)
*A01K 97/08* (2006.01)
*A01K 97/10* (2006.01)
*B60R 9/048* (2006.01)

(52) U.S. Cl.
CPC ............... *B60R 9/08* (2013.01); *A01K 97/08* (2013.01); *A01K 97/10* (2013.01); *B60R 9/048* (2013.01)

(58) Field of Classification Search
CPC .......... B60R 9/08; B60R 9/048; A01K 97/08; A01K 97/10
USPC ................................................. 224/324, 922
See application file for complete search history.

(56) References Cited

U.S. PATENT DOCUMENTS

| | | | | |
|---|---|---|---|---|
| 2,171,053 A * | 8/1939 | White | ....................... | B60R 9/12 224/317 |
| 2,721,680 A * | 10/1955 | Steckman | ............... | B60R 5/006 211/119.007 |
| 3,155,299 A * | 11/1964 | Horne | ..................... | B60R 5/006 211/70.8 |
| 3,524,572 A * | 8/1970 | Hall | ........................ | B60R 5/006 211/70.8 |
| 4,582,203 A * | 4/1986 | Davis | ..................... | A01K 97/10 211/60.1 |
| 4,728,019 A * | 3/1988 | Olliges | ..................... | B60R 9/12 224/315 |
| 4,779,914 A * | 10/1988 | Friedline | ................ | A01K 97/10 211/198 |
| 4,881,674 A * | 11/1989 | Medianik | ................ | B60R 5/006 211/70.8 |
| 5,005,509 A * | 4/1991 | Williams | ................ | B63B 17/00 114/343 |
| 5,094,351 A * | 3/1992 | Barney | ................ | A47B 81/005 211/117 |
| 5,435,473 A * | 7/1995 | Larkum | .................... | B60R 9/08 211/4 |
| 5,454,499 A * | 10/1995 | Gibbs | ..................... | B60R 9/048 224/309 |
| 5,460,306 A * | 10/1995 | Rudd | ..................... | A01K 97/10 224/535 |

(Continued)

*Primary Examiner* — Peter N Helvey
(74) *Attorney, Agent, or Firm* — Justin Luby

(57) ABSTRACT

A two piece fishing rod storage assembly, especially designed to be mounted on a automobile roof rack, is provided. The rear assembly is installed on the rear roof rack crossbar and the front assembly is installed on the front roof rack crossbar. The rear assembly is comprised of a plurality of hollow tube sections connected to each other, running parallel to each other, and longitudinally with the automobile. In the rear of and spanning the inside of the hollow tube sections are a gimbal attached rod to prevent rotation of the fishing rod while in the rack. The front assembly is an "alligator style" horizontal clamping apparatus which clamps around the midsection or tip of a fishing rod and locks closed to prevent theft.

4 Claims, 6 Drawing Sheets

(56) References Cited

U.S. PATENT DOCUMENTS

| | | | | | |
|---|---|---|---|---|---|
| 5,544,797 | A | * | 8/1996 | Silva | B60R 7/005 |
| | | | | | 211/70.8 |
| 5,560,138 | A | * | 10/1996 | Dentsbier | A01K 97/10 |
| | | | | | 211/70.8 |
| 5,632,427 | A | * | 5/1997 | Gattuso | A01K 97/10 |
| | | | | | 211/70.8 |
| 5,678,348 | A | * | 10/1997 | Zielinski | A01K 97/08 |
| | | | | | 211/70.8 |
| 5,715,952 | A | * | 2/1998 | Chichetti | A01K 97/10 |
| | | | | | 211/70.8 |
| 6,003,748 | A | * | 12/1999 | Rivenbark | B60R 9/08 |
| | | | | | 211/70.8 |
| 6,267,425 | B1 | * | 7/2001 | Dorsey | A01K 97/08 |
| | | | | | 211/70.8 |
| 6,360,902 | B1 | * | 3/2002 | Searles | A01K 97/10 |
| | | | | | 211/70.8 |
| 6,460,231 | B2 | * | 10/2002 | Bourgerie | A01K 97/08 |
| | | | | | 24/487 |
| 7,219,464 | B1 | * | 5/2007 | Kujawa | A01K 97/08 |
| | | | | | 211/70.8 |
| 7,707,765 | B2 | * | 5/2010 | Liao | A01K 97/10 |
| | | | | | 224/321 |
| 8,375,622 | B1 | * | 2/2013 | Holzmann, Jr. | A01K 97/10 |
| | | | | | 43/21.2 |
| 8,746,469 | B1 | * | 6/2014 | De La Torre | B60R 9/08 |
| | | | | | 211/70.8 |
| 8,875,963 | B2 | * | 11/2014 | Knutson | A01K 97/08 |
| | | | | | 224/405 |
| 9,888,772 | B2 | * | 2/2018 | Quinto | A47B 81/005 |
| 2006/0237501 | A1 | * | 10/2006 | Gonzalez | A01K 97/08 |
| | | | | | 224/325 |

* cited by examiner

AUTOMOBILE FISHING ROD TRANSPORTATION RACK ATTACHMENT

CROSS-REFERENCE TO RELATED APPLICATIONS

N/A

FIELD OF THE INVENTION

The present invention relates generally fishing rod holders, and more specifically to fishing rod holders adapted to be mounted to the roof of an automobile.

BACKGROUND

Fishing rods typically are long, flexible and susceptible to damage during transport and storage between uses, particularly in circumstances where they must be carried on automobiles where only limited space is available for both equipment and people. Also, as those involved in fishing well know, fishing rods and reels are oftentimes quite expensive which only further increases the importance of providing for their safe, secure and protected storage particularly on automobiles on which they are being transported between uses.

Fishing rods and reels are long and fragile apparatuses that need to be protected from damage and theft during transportation. Due to the length of the rods, to prevent typically the will either need to be supported the entire length of the rod, or secured at two locations, near the front and the aft of the rod. Securing the rod at either end will prevent most events which would cause the rod from bending to the point of damage from occurring.

Additionally, due to the length of a fishing rod, fishing rods are a difficult item to carry in an automobile, particularly when the automobile is filled with other equipment and supplies as well as those persons going fishing. For this reason, a roof mounted carrier is an ideal means to remediate these transportation difficulties.

Many automobiles, particularly SUVs are equipped with roof racks. A roof rack is a set of bars secured to the roof of a motor car. It is used to carry bulky items such as luggage, bicycles, canoes, kayaks, skis, or various carriers and containers. They allow users of an automobile to transport objects on the roof of the vehicle without reducing interior space for occupants, The roof rack systems are typically comprised of: towers, which bear the weight of everything on your roof, and are installed at the strongest points on a vehicle's roof; and front and aft crossbars that run across the width of the vehicle roof, which you then mount your activity-specific racks to; whether it's ski racks, bike racks, cargo boxes, kayak racks, etc. Crossbars support the weight of all the gear you're adding to the roof and transfer the weight to the towers/feet.

These roof rack systems provide and ideal location to store fishing rods on an automobile for two reasons: 1) the remove the fishing rods from passenger area, providing more space for passengers, and 2) the roof rack is naturally designed with front and aft crossbars, which can be used to secure the fishing rod near the front and aft, protecting the fishing rod from damage.

However, simply lashing fishing rods to an existing roof rack system does not provide the security necessary. Fishing rods and reels are expensive components which would be vulnerable to theft without an additional security device, therefore, additional measures need to be taken to prevent potential thieves from stealing the rods and reels when left unattended on the roof rack.

However, simply lashing fishing rods to an existing roof rack system does not provide the necessary protection for the rods and reels either. During transportation the rods and reels will be subjected to vibrations and jostling which, if not properly secured, could lead to damage as a result of the equipment getting banged against other equipment or against the roof of the car.

U.S. Pat. No. 6,499,248 teaches a fishing rod holder which can be mounted on a roof rack comprising an elongated tube provided with an elongated slot through which a fishing rod is receivable for protective containment within the tube. A notch at one or both ends of the slot is configured to seat the reel component of one or two fishing rods and restrict longitudinal movement of the rod in the tube. A retainer, such as a lock, is secured to the tube for removably spanning the slot for securing a fishing rod removable in the tube. While this device achieves the goals of securely transporting a fishing rod and reel to a roof rack for transport, the design of the device only allows for a single rod to be stored in the device. Therefore, if it is desired to transport multiple rods at a time, which is often the case, multiple units must be purchased and configured for each rod, which can be costly and time consuming.

Accordingly, there is a need for a single apparatus which is capable of securing multiple fishing rods to the roof of an automobile which is capable of preventing damage to the fishing rods as a result of the typical vibrations and jostling which would occur during the transportation.

SUMMARY

To accomplish these objects a two piece fishing rod storage assembly, especially designed to be mounted on a automobile roof rack, is provided. The rear assembly is installed on the rear roof rack crossbar and the front assembly is installed on the front roof rack crossbar.

The rear assembly is comprised of a plurality of hollow tube sections connected to each other, running parallel to each other, and longitudinally with the automobile. In the rear of and spanning the inside of the hollow tube sections are a gimbal attached rod. Additionally the tubes are connected to the rear roof rack crossbar utilizing a clamping device.

The front assembly is an "alligator style" horizontal clamping apparatus which is connected to the front roof rack crossbar utilizing a clamping device. The upper section of the clamping apparatus pivots around one end of the apparatus. The lower section of the clamping apparatus has a plurality of recesses formed to receive and securely hold the end of a fishing rod in place. At the opposite end of the clamping apparatus from the pivot end is a push button locking device connecting the upper and lower sections together.

To utilize the two piece fishing rod storage assembly once the front and rear assemblies have been clamped to the roof rack, the clamping apparatus is unlocked and the upper section is pivoted vertically to provide access to the recesses in the lower section. The grip handles of fishing rods are slid into the hollow tube sections until the gimbals on the grip handles engage with the gimbal rods in the rear of the hollow tube sections. After the gimbals on the grip handles engage with the gimbal rods the tips of the rods are pressed into the formed recessions in the lower section of the clamping apparatus. Once the fishing rods have been installed into the hollow tube sections and the formed recessions the upper section is pivoted horizontally until the push button locking device is engaged.

The engagement of the gimbals on the grip handles engage with the gimbal rods prevents the rods from rotating during transportation, preventing the rods from hitting other rods or the roof the automobile during transportation, causing damage. Additionally, the individual recessions in the front assembly prevent the front of the rods from sliding laterally during transportation, possibly damaging other rods as well.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION AND PREFERRED EMBODIMENT

Figure 1:
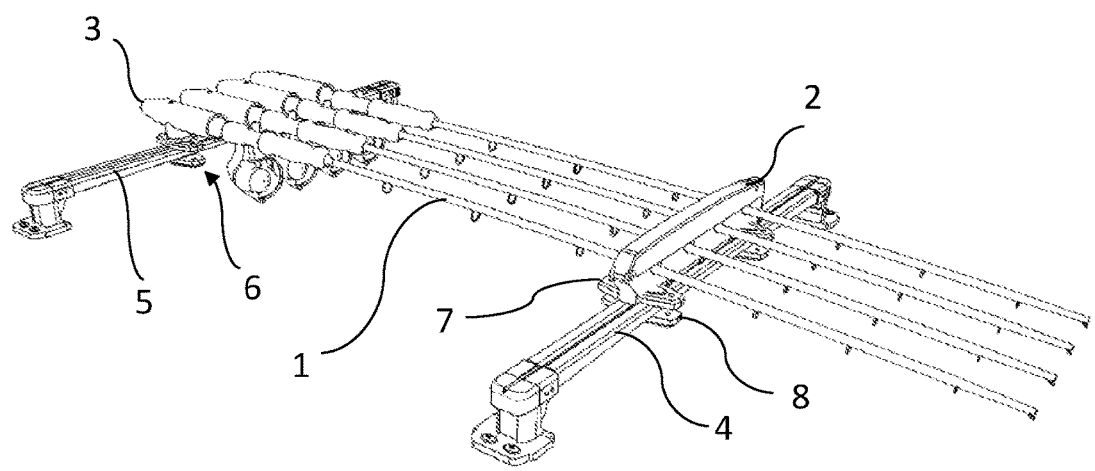
FIG. 1 illustrates a perspective view the automobile fishing rod storage assembly when installed on automobile roof rack with fishing rods installed.

Referring to FIG. 1 the automobile fishing rod storage assembly of the present invention is utilized to store and transport a plurality of fishing rods 1 on the rooftop of an automobile utilizing the automobile's roof rack. In the preferred embodiment, the automobile fishing rod storage assembly is comprised of two sub-assemblies, the front assembly 2 and the rear assembly 3. Each of the assemblies is respectively affixed to the front crossbar 4 and rear crossbar 5 of roof rack.

Figure 3:
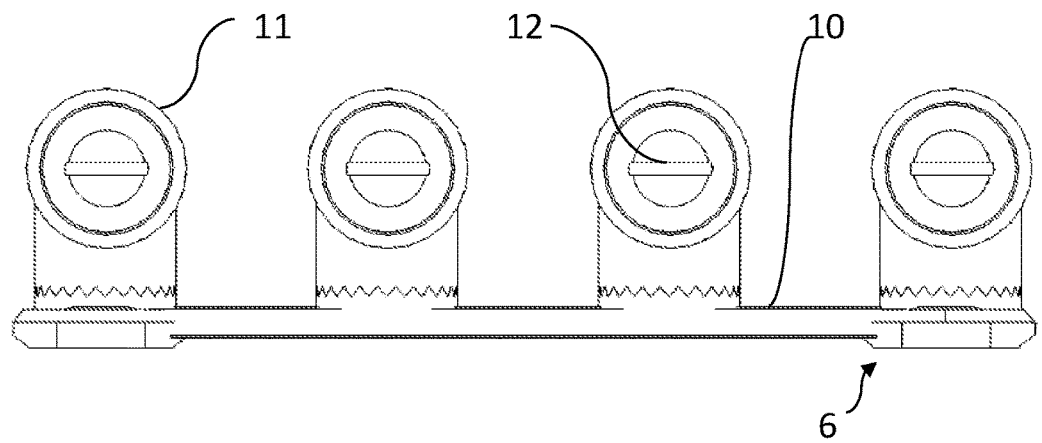
FIG. 3 illustrates a front view drawing of the rear assembly.

Referring to FIG. 3, in the preferred embodiment the front assembly 2 and rear assembly 3 are respectively affixed to the front crossbar 4 and rear crossbar 5 of roof rack utilizing sandwich clamps 6. The upper section of the sandwich clamp 7 is fixably attached to the rear assembly 3 or the front assembly 2 and the lower section 8 is independent of the assemblies. Running through both the upper 7 and lower sections 8 of the sandwich clamp 6, and aligned with each other, are a pair of through holes 9. When affixing either assembly to a roof rack, the upper section 7 of the sandwich clamp 6 is aligned atop the crossbar 4, 5 of the roof rack, with said through holes 9 flanking the crossbar 4, 5 on either side. And the lower section 8 of the sandwich clamp 6 is aligned below the crossbar 4, 5 of the roof rack, with said through holes 9 aligned with the upper section 7. Bolts are run through each of the cross sections and nuts are affixed and tightened, compressing the clamp 6 against the crossbar 4, 5 and firmly holding the assembly 2, 3 in place.

While the preferred embodiment the utilizes clamps 6 to affix the front assembly 2 and rear assembly 3 to an existing roof rack, there are a number of means known to those skilled in the art, which could be utilized as a means to mount the automobile fishing rod storage assembly to the roof of the automobile. Straps could be utilized to replace the clamps, or the holes could be drilled through the crossbars and the assemblies could be directly bolted to the crossbars. Additionally for automobiles that do not have roof racks installed, door jamb clips, with vehicle specific which clips fit snugly into door-jams could be utilized as well.

Figure 2:
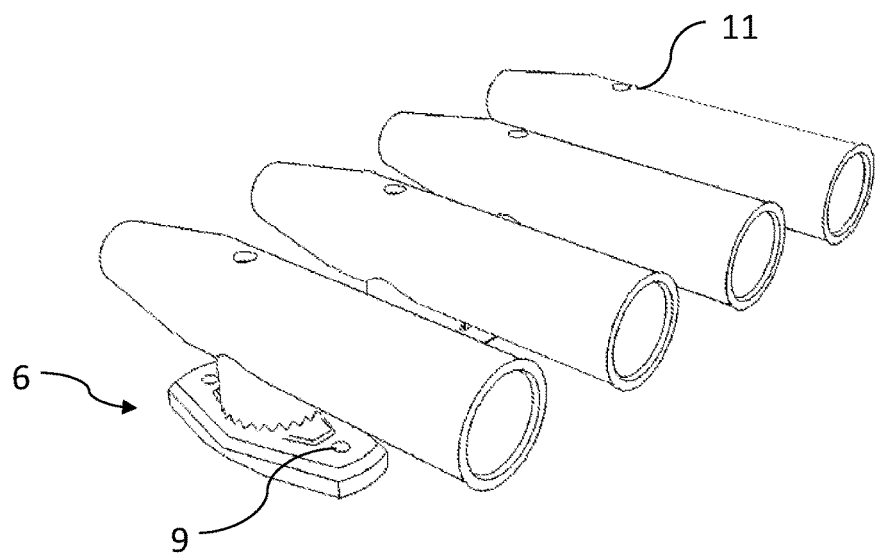
FIG. 2 illustrates a perspective view drawing of the rear assembly.

Referring s to FIGS. 2 & 3, the rear assembly 3 is comprised of: two sandwich clamps 6, a crossbar 10, and a plurality of fishing rod handle holder tubes 11.

The crossbar 10 provides structural support to the assembly 3 and an attachment means for the fishing rod handle holder tubes 11 and the sandwich clamps 6 and is designed to run parallel with the rear crossbar of the roof rack. There are a number of means which one skilled in the art could use an attachment means in place of a crossbar, including affixing the tubes 11 directly to each other, and the clamps 6 directly to the tubes 11.

The sandwich clamps 6 are affixed to the underside of the crossbar 10 at either end the of the crossbar 10. The sandwich clamps 6 can be affixed to the crossbar 10 in any number of means known to those skilled in the art including fasteners, welding, adhesives, or event having the entire assembly manufactured as a single molded part.

The fishing rod handle holder tubes 11 are hollow cylindrical tubes which encase the fishing rod 1 handles, preventing them from moving up and down and side to side. The inner diameter of the tube 11 is slightly larger than the exterior diameter of the fishing rod 1 handle, and the tube 11 is approximately the same length as the distance between the tip of the fishing rod handle and the location where the fishing reel is connected to the fishing rod. While the preferred embodiment utilizes hollow cylindrical tubes to encase the fishing rod 1 handles, it would be obvious to one skilled in the art that this function could be achieved through a number of shapes, and the terminology tube is not meant to be limiting.

Referring to FIG. 3, located inside of the fishing rod handle holder tube 11 and at the rear of the tube 11, is a fishing rod gimbal pin 12. The fishing rod gimbal pin 12 is a round pin which spans the inner diameter of the fishing rod handle holder tube 11. The diameter of the pin 12 is the same diameter of the standard gimbal pin used with a fighting belt.

Many fishing poles are equipped with gimbal ends which are used with fighting belts. Typical gimbal ends connect to pins in the fighting belt to prevent the fishing rod end from shifting in the hands of the fisherman. This apparatus re-utilizes these ends and said fishing rod gimbal pin 12 in the fishing rod handle holder tube 11 to provide a means to prevent the fishing rod from rotating in the holder during transportation. Limiting rotation of the fishing rods when installed in the fishing rod handle holder tube 11 prevents damage to the rods 1 as a result of shifting during transportation.

Figure 4:
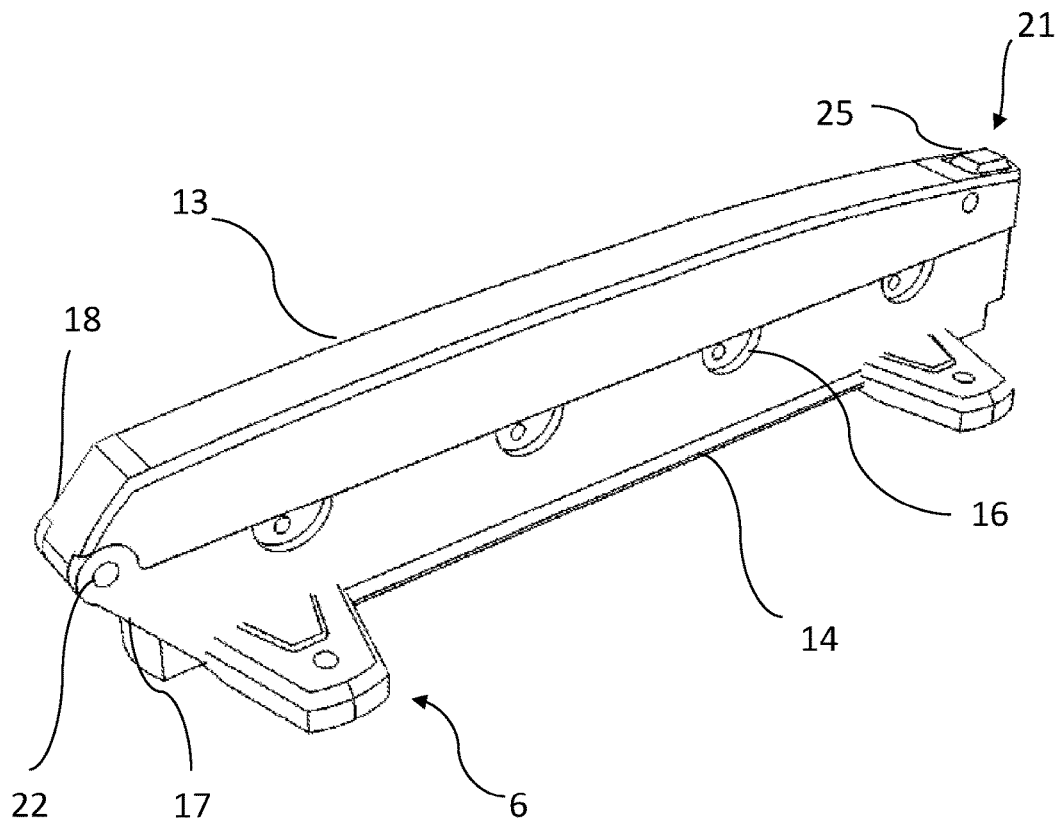
FIG. 4 illustrates a perspective view drawing of the front assembly when the assembly is pivoted closed.
Figure 5:
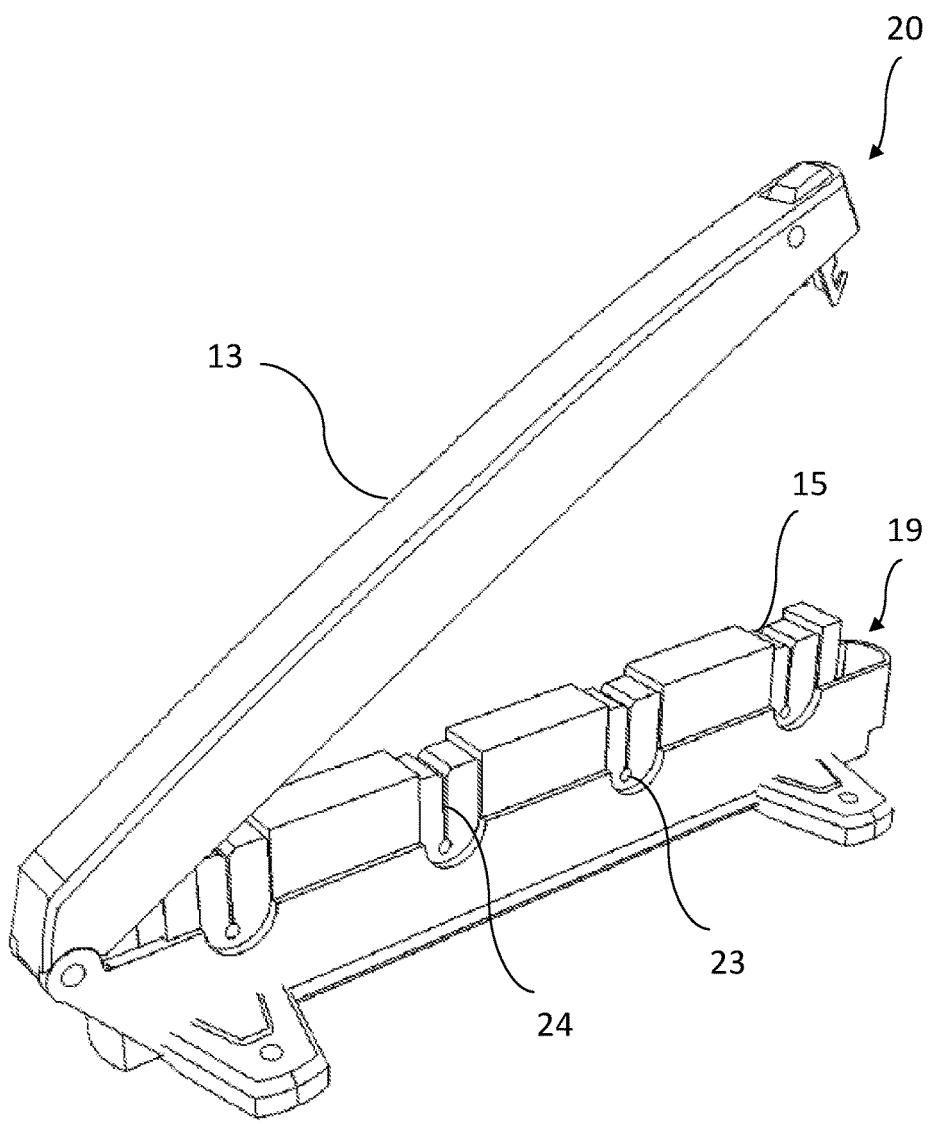
FIG. 5 illustrates a perspective view drawing of the front assembly when the assembly is pivoted open.
Figure 6:
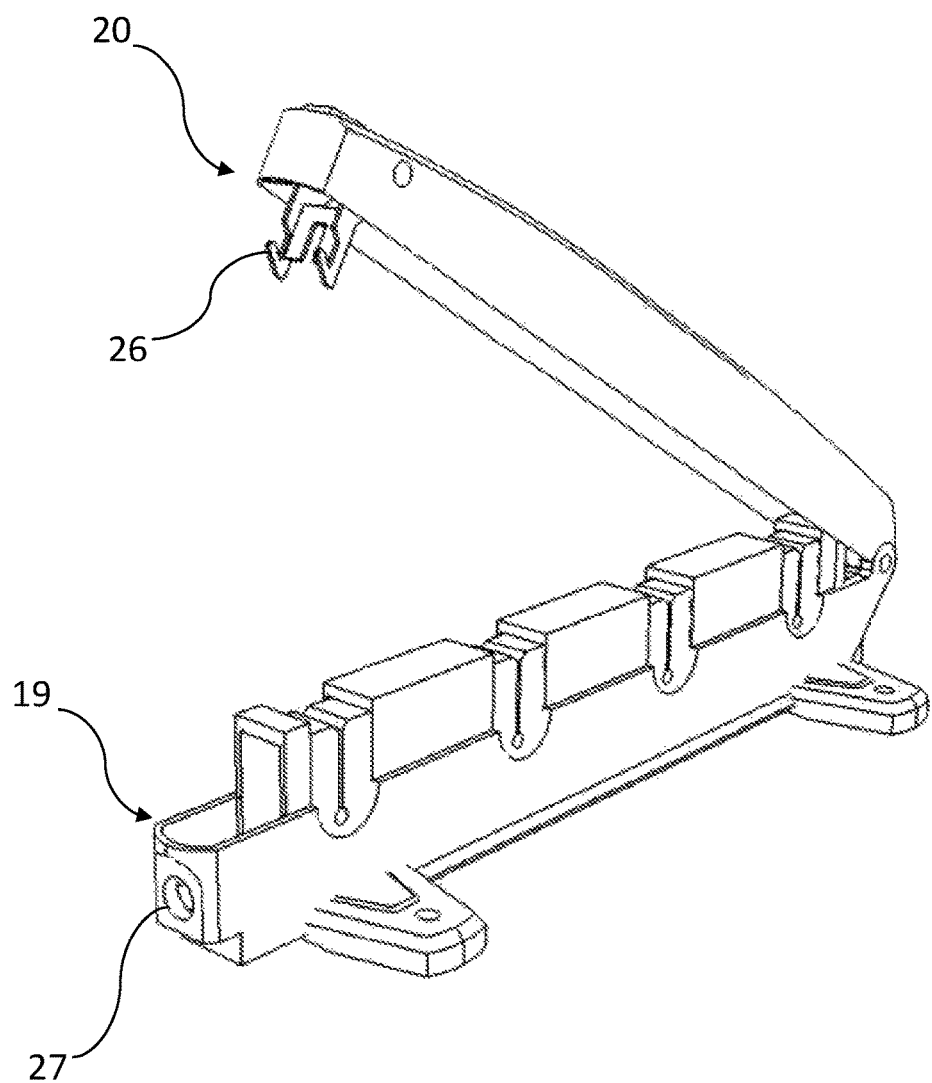
FIG. 6 illustrates a perspective view drawing of the front assembly when the assembly is pivoted open.

Referring s to FIGS. 4, 5, & 6, the front assembly 2 is comprised of: two sandwich clamps 6, a upper clamping section 13, a lower clamping section 14, and an insert 15.

The lower clamping section is a hollow rectangular shell, approximately the same width across as the width of the rear assembly 3. Located throughout the lower clamping section 14, and running longitudinally with the automobile are a plurality of U shaped channels 16. The number of U shaped 16 channels matches the number of fishing rod handle holder tubes 11 on the rear assembly 3, and the location of the channels 16 are aligned so that when both the front assembly 2 and rear assembly 3 are mounted on the roof rack, that an installed fishing rod 1 can extend from the fishing rod handle holder tubes 11 through the channel 16, wherein the fishing rod handle with rest in the fishing rod handle holder tubes 11 and the midsection or tip of the fishing rod will rest in the channel 16.

The U shaped channels 16 provide a means to prevent the fishing rods 1 from shifting laterally during transportation. Lateral shifting of the fishing rods 1 could put undue stress on the rods 1 and possibly lead to damage. There are a number of means which one skilled in the art could use an to prevent the fishing rods 1 from shifting laterally during transportation in place of the U-shaped channels 16, including V notches and other shaped notches and channels.

The sandwich clamps 6 are affixed to the underside of the lower clamping section 14 at either end the of the lower clamping section 14. The sandwich clamps 6 can be affixed to the lower clamping section 14 in any number of means known to those skilled in the art including fasteners, welding, adhesives, or event having the entire assembly manufactured as a single molded part.

Located at one end of the lower clamping section 14 is a hinge member 17. The hinge member 17 will be connected to a hinge member 18 on the upper clamping section 13, to create a hinge as a means for opening and closing the front assembly during 2 installation of the fishing rods 1, without needing to disassemble the front assembly 2.

In the preferred embodiment the hinge member 17 is molded into the lower clamping section 14, however, the hinge member 17 could also affixed to the lower clamping section 14 in any number of means known to those skilled in the art including fasteners, welding, and adhesives.

Located at the other end of the lower clamping section 14 is a locking apparatus 19. The locking apparatus 19 works in conjunction with a mating locking apparatus 20 on the upper clamping member 13 to create a locking assembly 21 which creates a means for securing the front assembly 2 in the closed position.

In the preferred embodiment the locking member 19 is molded into the lower clamping section 14, however, the locking member 19 could also affixed to the lower clamping section 14 in any number of means known to those skilled in the art including fasteners, welding, and adhesives.

The upper clamping section 13 is a rectangular section, approximately the same width across as the width of the rear assembly 3.

Located at one end of the upper clamping section 13 is a hinge member 18. The hinge member 18 will be connected to the hinge member 17 on the lower clamping section 14 using a pin 22, rivet, or other apparatus known to those skilled in the art.

Located at the other end of the upper clamping section 13 is a locking apparatus 20. The locking apparatus 20 works in conjunction with a mating locking apparatus 19 on the lower clamping section 14.

Inside of the hollow lower clamping member 14 is an insert 15. The insert 15 is constructed of a cushiony material such as foam or expanded polystyrene. The insert 15 provides a means for alignment, impact dampening, and protection to the fishing rod 1 during transportation. Running through the insert 15 are a plurality of through holes 23 and slits 24 which run from the holes 23 to the top the insert 15. The holes 23 and slits 24 are aligned in the insert 15 such that when the insert 15 is installed in the lower clamping section 14, that holes 23 and slits 24 are aligned to be centered in the U shaped channel 16.

While the use of an cushiony insert 15 installed inside of the hollow lower clamping member 14 is preferred by inventor the as the means for means for alignment, impact dampening, and protection to the fishing rod 1 during transportation the same function could be achieved by other means known to those skilled in the art, such as adhering the protective materials to the channels in the lower clamping member 14 and/or upper clamping member 13.

Figure 7:
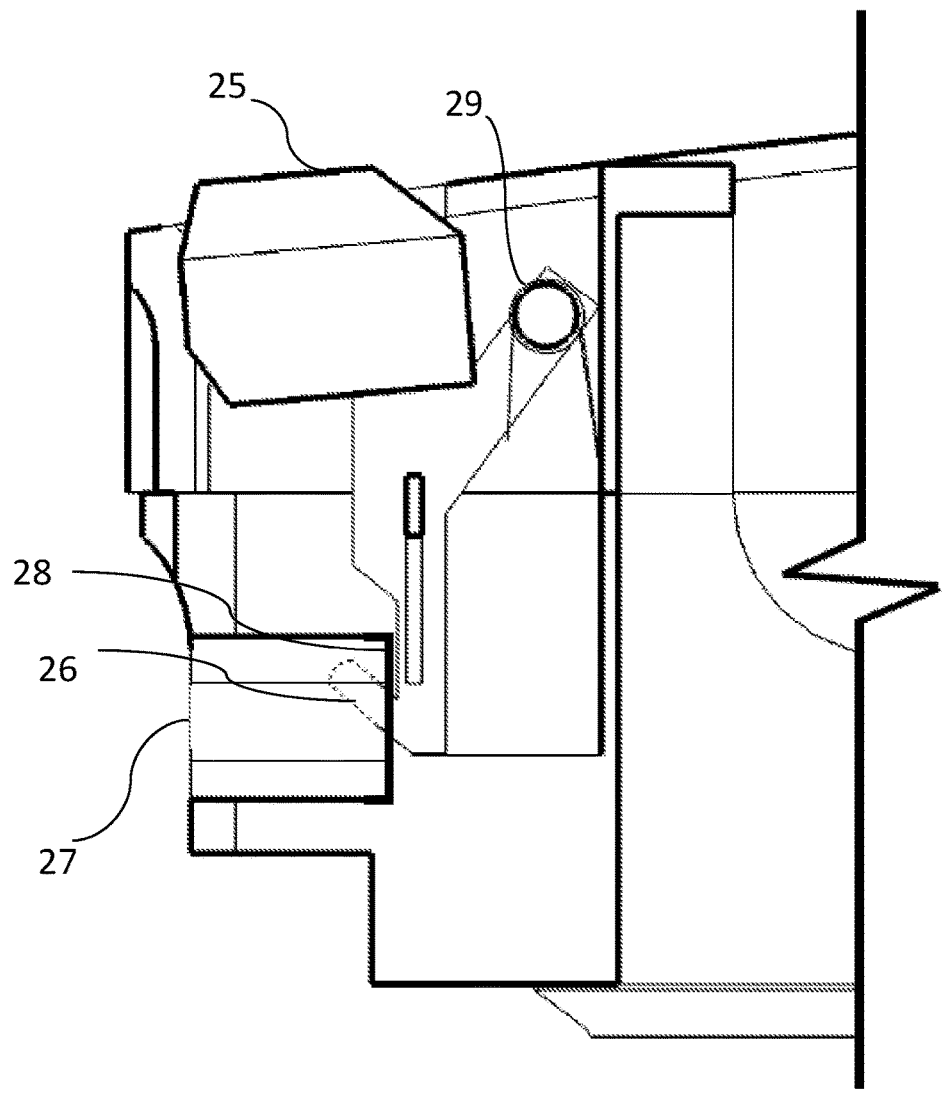
FIG. 7 illustrates a detailed assembly of the push-button locking assembly.

Referring to FIG. 7, in the preferred embodiment, the means for securing the front assembly in the closed position is a push button 25, spring loaded latch 26 with a cam lock recess 27. The push button 25 and spring loaded latch 26 are located in the upper clamping section 13, and a mating latch catch 28 as well as a keyed cam lock, located in the cam lock recess 27, are located in the lower clamping section 13. When the front assembly 2 is closed, the latch 26 will slide over the catch 28, and when in position, the spring 29 will engage the catch 28 with the latch 26. Once in place, the user will turn the keyed cam lock 27, putting the cam into position at the rear of the latch 26, so that the latch 26 cannot be disengaged from the catch 28.

While the preferred embodiment utilizes the aforementioned described push button 25 spring loaded latch 26 with a cam lock as a means for securing the front assembly 2 in the closed position, there are many means known to those skilled in the art capable of performing this same function, such as padlocks and toggle latches.

Figure 8:
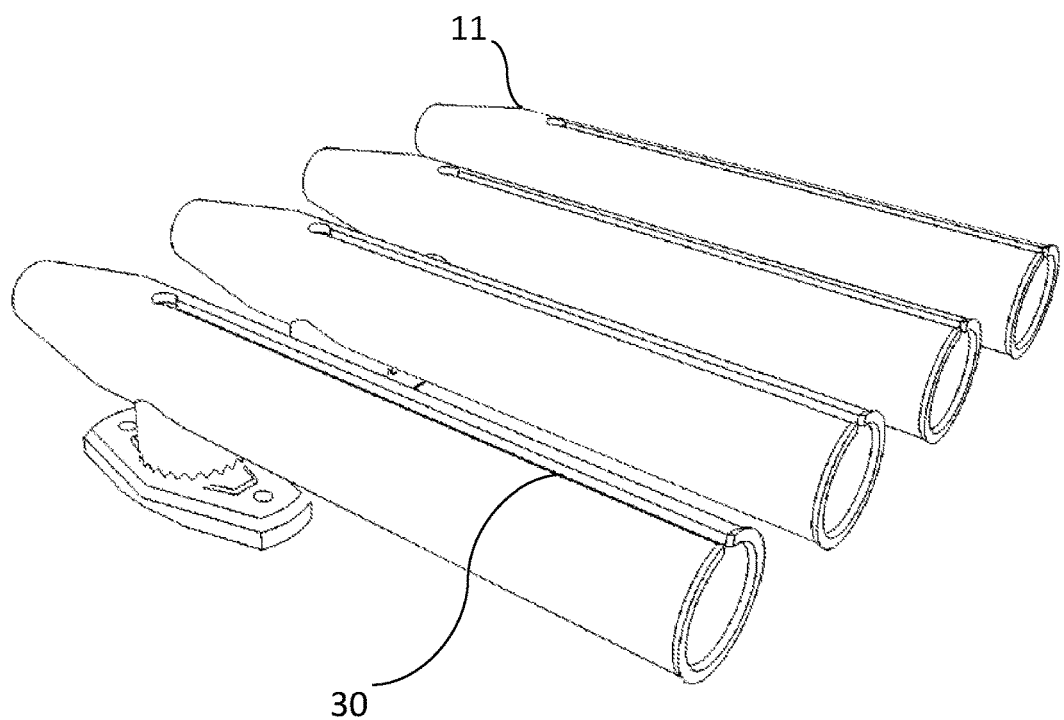
FIG. 8 illustrates a perspective view drawings of an alternate embodiment of the rear assembly.

FIG. 8 depicts and alternate embodiment of the rear assembly. Instead of utilizing a gimbal rod 12 to provide a means to prevent the fishing rod 1 from rotating in the holder during transportation, this embodiment utilizes a slot 30 in the top of the fishing rod handle holder tubes 11 to perform the same means. The width of the slot 30 is roughly the same dimension as the width of the "leg" of the reel where it is attached to the reel seat on the fishing rod 1.

In this embodiment, the length of the fishing rod handle holder tubes 11 are longer than in preferred embodiment, so that the tubes 11 will extend beyond the "leg" of the reel. When the rod 1 is fully inserted into the tube 11, the leg of the reel will be flanked on either side laterally by the slot 30, preventing the rod from rotating during transportation.

In the preferred embodiment the automobile fishing rod storage assembly is primarily comprised of a marine grade polycarbonate material, with exception to the insert 15, spring 29, and lock 27, to provide durability. However, this invention could be constructed of many materials known to those skilled in the art, such as aluminum and plated steel.

It would be appreciated by those skilled in the art that various changes and modifications can be made to the illustrated embodiments without departing from the spirit of the present invention. All such modifications and changes are intended to be covered by the claims.

What is claimed is:

1. An apparatus for storing and transporting a fishing rod or a plurality of fishing rods atop a roof of an automobile comprising;
   a first member for receiving a fishing rod handle comprising;
   a rectangular mounting bar with a top and bottom, two side ends, and a front and back side where the front and back sides align laterally with the automobile and a sandwich clamp affixed to either side end of the rectangular mounting bar;

a plurality of hollow tube-like structures each with an inner diameter and outer diameter which are affixed to the top of the rectangular mounting bar, align longitudinally with the automobile extend beyond the front side of the rectangular mounting bar and extend beyond the back side of the rectangular mounting bar;

a round pin with a first end and second end located in each of the tube-like structure where both the first end and second ends are immovably affixed to the inner diameter of the tube-like structure, spans the hollow tube-like structures inner diameter, the round pin capable of engaging with a fishing rod gimbal;

a second member receiving a fishing rod midsection or tip comprising;

a receiving structure with a plurality of recesses aligned with and equaling the number of tube-like structures in the first member, each of said recesses capable of receiving the fishing rod midsection or tip and restricting vertical and lateral movement of the fishing rod midsection or tip;

a hinged clamp arm which extends from a hinge point across said recesses, which when opened allows the fishing rod to be inserted into and removed from said recesses, and when closed position prevents removal of the fishing rod from the apparatus;

a means for means for securing the hinged clamp arm in the closed position;

a means for mounting the second member to the roof of the automobile;

wherein said first and second members are fixable attached to the roof of an automobile and aligned to each other such that when a fishing rod handle is inserted into the first member that the tip or midsection of said fishing rod can be received into said recesses in the second member;

at least one fishing rod with a handle end and a gimbal affixed to the handle end and a tip or mid section, wherein the at one least fishing rod is stowed by opening the hinged clamp arm, inserting the handle end of the fishing rod into a tube-like structure, engaging the gimbal and the smooth round pin, inserting the tip or midsection of the fishing rod into the aligned recess, and closing and securing the hinged clamp arm in the closed position.

2. The apparatus of claim 1, whereas said receiving structure with a plurality of recesses further comprises a hollow shell structure with a plurality of larger recesses aligned with and equaling the number of tube-like structures in the first member and a cushiony insert, installed inside of said shell structure, whereas the cushiony insert has a plurality of through holes and slits which run from the holes to the top the insert, and the holes and slits are aligned in the insert such that when the insert is installed inside the shell structure, that the holes are also aligned with and equaling the number of tube-like structures.

3. An apparatus for storing and transporting a fishing rod or a plurality of fishing rods atop a roof of an automobile comprising;

a first member for receiving a fishing rod handle comprising;

a rectangular mounting bar with a top and bottom, two side ends, and a front and back side where the front and back sides align laterally with the automobile and a sandwich clamp affixed to either side end of the rectangular mounting bar;

a plurality of hollow tube-like structures each with an inner diameter and outer diameter which are affixed to the top of the rectangular mounting bar, align longitudinally with the automobile extend beyond the front side of the rectangular mounting bar and extend beyond the back side of the rectangular mounting bar;

a means to prevent the fishing rod from rotating in the apparatus during transportation;

a second member receiving a fishing rod midsection or tip comprising;

a hollow receiving structure with a plurality of larger recesses aligned with and equaling the number of tube-like structures in the first member;

a cushiony insert, installed inside of said shell structure capable of receiving the fishing rod midsection or tip and restricting vertical and lateral movement of the fishing rod midsection or tip, whereas the cushiony insert has a plurality of through holes and slits which run from the holes to the top the insert, and the holes and slits are aligned in the insert such that when the insert is installed inside the shell structure, that the holes are also aligned with and equaling the number of tube-like structures;

a hinged clamp arm which extends from a hinge point across said recesses, which when opened allows the fishing rod to be inserted into and removed from said recesses, and when closed position prevents removal of the fishing rod from the apparatus;

a means for means for securing the hinged clamp arm in the closed position;

a plurality sandwich clamps affixed to the underside of the receiving structure;

wherein said first and second members are fixable attached to the roof of an automobile and aligned to each other such that when a fishing rod handle is inserted into the first member that the tip or midsection of said fishing rod can be received into said recesses in the second member;

wherein one or more fishing rods is stowed in the apparatus by opening the hinged clamp arm, inserting the handle of the fishing rod into a tube-like structure, inserting the tip or midsection of the fishing rod into the aligned recess, and closing and securing the hinged clamp arm in the closed position.

4. The apparatus of claim 3, whereas said apparatus for storing and transporting a fishing rod further comprises at least one fishing rod with a handle end and a gimbal affixed to the handle end and a tip or mid section and said means to prevent the fishing rod from rotating in the apparatus during transportation comprises a round pin with a first end and a second end where both the first end and second ends are immovably affixed to the inner diameter of the tube-like structure and span the hollow tube-like structures inner diameter and is engaged with the gimbal end in the handle of the fishing rod to prevent the fishing rod from rotating in the apparatus during transportation.

* * * * *